(12) United States Patent
Ziegler

(10) Patent No.: US 7,387,240 B2
(45) Date of Patent: Jun. 17, 2008

(54) SYSTEM AND METHOD OF SECURE INFORMATION TRANSFER

(75) Inventor: Robert Ziegler, Southlake, TX (US)

(73) Assignee: Accullink, LLC, Atlanta, GA (US)

( * ) Notice: Subject to any disclaimer, the term of this patent is extended or adjusted under 35 U.S.C. 154(b) by 74 days.

(21) Appl. No.: 11/010,191

(22) Filed: Mar. 8, 2005

(65) Prior Publication Data

US 2005/0194438 A1    Sep. 8, 2005

Related U.S. Application Data

(60) Provisional application No. 60/528,611, filed on Dec. 11, 2003.

(51) Int. Cl.
*G06K 5/00* (2006.01)

(52) U.S. Cl. .............. 235/382; 235/379; 235/380; 705/50; 380/277; 713/182

(58) Field of Classification Search ............ 235/382, 235/379, 380; 705/50; 380/277; 713/182
See application file for complete search history.

(56) References Cited

U.S. PATENT DOCUMENTS

| 6,547,134 | B2* | 4/2003 | Ogilvie | 235/380 |
| 2002/0161908 | A1 | 10/2002 | Benitez et al. | |
| 2003/0041029 | A1* | 2/2003 | Gould | 705/50 |

* cited by examiner

*Primary Examiner*—Seung H Lee
(74) *Attorney, Agent, or Firm*—Kilpatrick Stockton LLP

(57) ABSTRACT

Information may be securely transferred from a first device to a second device over an open network by transferring software to the first device and executing the software. Data representing the information is entered at the first device and transferred to the second device. The second device uses the data to determine the information.

23 Claims, 1 Drawing Sheet

SYSTEM AND METHOD OF SECURE INFORMATION TRANSFER

CROSS-REFERENCE TO RELATED APPLICATIONS

This application claims priority on U.S. Provisional Application No. 60/528,611, filed Dec. 11, 2003.

TECHNICAL FIELD OF THE INVENTION

The invention relates to the field of secure information transfer, in particular secure information transfer for open-network transactions.

BACKGROUND OF THE INVENTION

The need for secure communication is ancient and has grown to paramount importance. Any system implementing an electronic transfer of funds, for example, requires multi-level security measures. The simple acts of assigning and using a Personal Identification Number (PIN) to access the ATM debit network requires the use of highly controlled protocols and/or hardware.

Any transaction is susceptible to fraud and deceptions. Even a face-to-face encounter between a customer and banker could be subject to frauds of impersonation or false identity. Transactions between strangers and more particularly, transactions conducted on an open-network like the Internet cannot be conducted within reasonable risk limitations without some kind of identity verification.

The use of a PIN provides a certain level of verification, as we assume that the only person with knowledge of the PIN should be the authorized cardholder. Of course, any communication of the PIN is subject to eavesdropping, interception or man-in-the-middle attacks. When connecting to the ATM network, the PIN may not be transmitted, even in encrypted form, over open networks.

Information does not have to be transmitted to be communicated, however. For example, zero-knowledge techniques can be used to communicate information without transmitting the information. Zero-knowledge protocols take advantage of the fact that possession of data can be proved without revealing the data.

Another method of communicating information without transmitting the information can be seen in a PIN mailer process. The PIN mailer process allows a cardholder to select a PIN using a form and the paper mail. The PIN mailer process is compliant with current ANSI standards and accepted in the banking industry.

The card issuer associates a form with a card that has been issued to a cardholder. The association is typically to a specific form using a serial number and may be an association to a form type using a form ID. The card issuer sends the associated form to the cardholder. The cardholder is instructed to select a PIN for a given account by completing a paper-based form and delivering it to the card issuer or the issuer's producer via normal mail. The paper form that the cardholder completes is designed specifically for the purpose. First, it is typically a multi-layer carbon-copy form. The form includes a top page for entering the PIN in a manner that is clearly understandable to the user. The top page allows the insecure entry of the information. According to protocol, the top page is destroyed by the cardholder as soon as the PIN is entered, so that there is no insecure copy of the information. The bottom page, or pages, are specifically designed to protect the data that has been entered. Parts of the page may be generated through cryptographic processes to further obscure the data. The cardholder completes the form by selecting their PIN on the top page by circling one or more values or filling in bubbles representing their desired PIN. Position information is transferred through to the bottom page. The position information does not include, in any form, the numerals that make up the PIN. The encoded information represents the position of the PIN on the now-destroyed top sheet.

Once the cardholder destroys the top page of the form, there is no cleartext or encrypted version of the PIN. This bottom page containing position information is then sent via normal mail to the card issuer. The page is safe from an interception attack because the form has no information identifying the cardholder and no information to assist in identifying the numerals associated with the position data. The card issuer is able to retrieve the value representing the PIN from the returned 'bottom' page and information related to the request form, such as a form number or serial number.

What is needed, therefore, is a system and method for transferring information over an open network in a secure manner.

SUMMARY OF THE INVENTION

Information may be securely transferred from a first device to a second device over an open network by transferring software to the first device and executing the software. Data representing the information is entered at the first device and transferred to the second device. The second device uses the data to determine the information.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
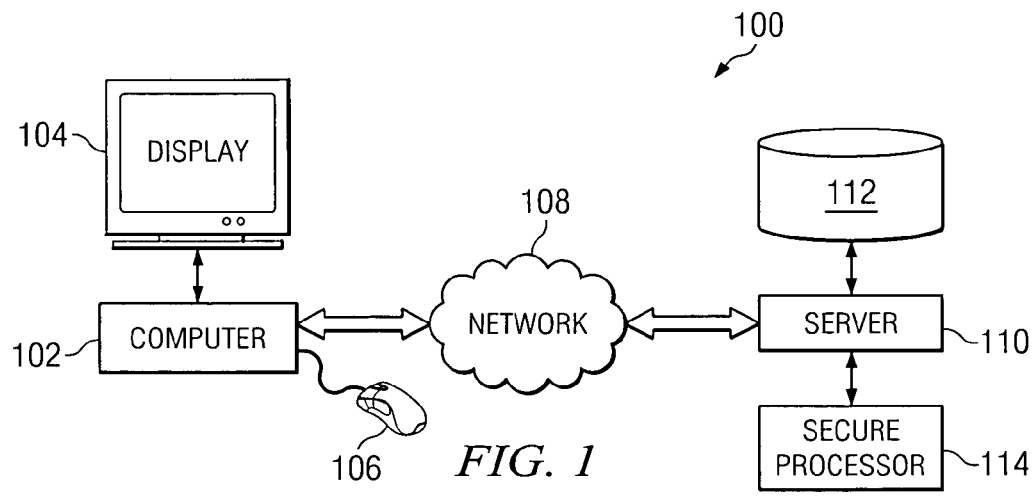
FIG. 1 is a diagram of a system for secure information transfer.

Referring now to the drawings, wherein like reference numbers are used to designate like elements throughout the various views, several embodiments of the present invention are further described. The figures are not necessarily drawn to scale, and in some instances the drawings have been exaggerated or simplified for illustrative purposes only. One of ordinary skill in the art will appreciate the many possible applications and variations of the present invention based on the following examples of possible embodiments of the present invention.

With reference to FIG. 1, a system 100 for the secure transfer of information is shown. A computer 102 including a pixelated display 104 and a pointing device 106 such as a mouse may be used to send information, such as a PIN, to an authority. The computer 102 is communicably connected to the authority server 110 by network 108. Server 110 may be connected to a storage device 112 and a secure processor 114.

Typically, an initialization process authenticates the computer 102 to the server 110. A selected and perhaps tailored version of PIN entry software is associated with the computer 102 and is loaded onto the computer 102 from the server 110. The software may be cryptographically linked to an Authorization process. The cardholder utilizes the software to enter data representing the PIN, such as position data indicating the position of a PIN numeral on a pixelated display. The data may be sent from the computer 102 to the server 110 through a strongly encrypted communications channel.

When the data is received by the server 110, the data is processed at secure processor 116 using association data stored in storage device 112. The secure processor provides the PIN for authentication, verification, identification or any other suitable purpose. It will be recognized by those skilled in the art that other forms of data could be communicated in the same manner.

The computer display may present a graphic representation of a traditional PIN Pad to the cardholder. The graphic representation of a PIN pad is a form provided to the cardholder providing a familiar interface to enhance usability and acceptance. However, clicking a mouse button as the cursor is on a graphic representation of a numeral provides the computer with the display address point and not the numeral. Only the server has the association that will generate the numeral from the display address point.

An Acquisition process securely obtains the information from which a card holder's PIN can be distilled. An Authorization process allows an Internet-based merchant to request a debit transaction be authorized and obtain payment.

Figure 2:
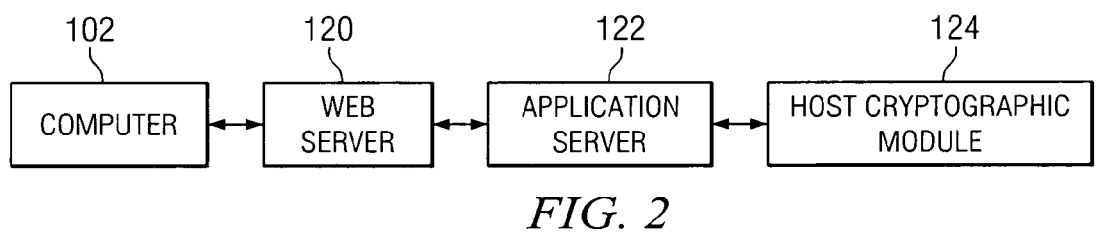
FIG. 2 is an architectural diagram of the acquisition process.

With reference to FIG. 2, a diagram of an information transfer system is shown. A computer 102 is communicably connected to a Web server 120. The Web server 120 provides an interface with an application server 122. The application server 122 is connected to a host cryptographic module 124.

Each of these components form a cryptographic zone. The cryptographic zones may be identified by the cryptographic controls in place within the zone and delineated where cryptographic controls change. The first zone provides the security for communication between computer 102 and web server 120. SSL is the standard encryption used for Internet communication.

The data sent from the computer 102 to the application server may be encrypted. For example, the Advanced Encryption Standard (AES) may provide 256 Bit encryption of all information communicated between the computer 102 and the application server 122. The data sent from computer 102 to the PIN Distillation TRSM 124 may be encrypted. For example, the AES may provide 256 encryption between the computer 102 and the TRSM 124.

Acquisition data is acquired by system software installed on computer 102. The acquisition data may be encypted using an $AES_{(DATA)}$Key.

The first zone includes the computer 102 and is basically uncontrolled: The client PC 102 is an end-point for almost all cryptographic security in the Acquisition process and is not directly controllable by the system. It is advantageous to establish a trusted presence at this uncontrolled point. One way to establish a trusted presence is to use cryptographic methods provided as part of system software that is securely downloaded, under 128-bit SSL, at the start of each session. Trust is further enhanced through the use of nationally recognized, federal standard message integrity verification technology: FIPS 180-2 Secure Hash Standard (SHS) Secure Hash Algorithm (SHA) SHA-512.

The second zone includes the web server and is a controlled area that is accessible via the Internet. It provides an accessible interface to the clients, but does not perform any meaningful function except transmitting information back to the Application Processing Zone. The web server establishes the initial secure session to enable the download of the system software and the upload of the client Public cryptographic key (RSA 1024-Bit) to the Host Cryptographic Device in Zone 4. The web server is located within a physically secure area.

The third zone includes application processing: This zone performs much of the meaningful work of the Acquisition phase. The Application server 122 establishes itself as the end-point for the AES (256 Bit) encrypted communications channel to the client 102. The application server 122 may be located within a physically secure area.

The forth zone includes a secure area housing two components, the Host Cryptographic Module (HCM) and the Acquisition Data Store. Both components are within a physically secure area.

The HCM is a FIPS 140-2 Level 3 device and is the workhorse of the encryption process in the Acquisition process. It generates and uses the AES Keys created (Communications and Data) to support and protect information during the Transmission process. It also performs RSA and TDES encryption processes.

This is a cryptographically secured (128 Bit TDES) holding area for acquisition data while waiting for the Authorization process to begin.

Figure 3:
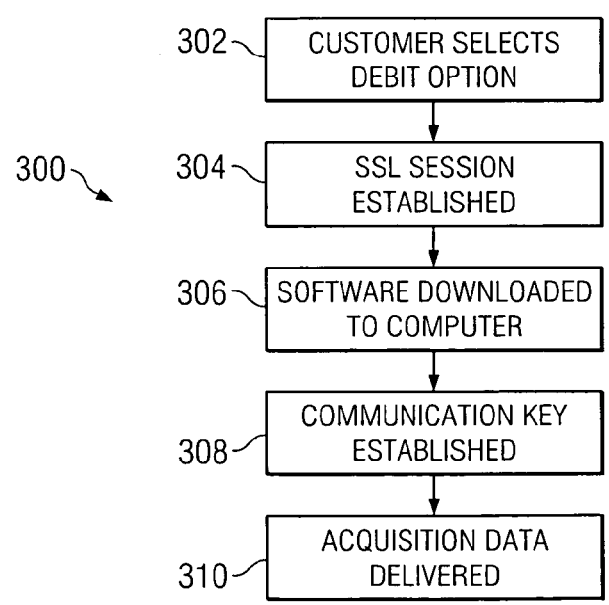
FIG. 3 is an architectural diagram of the authorization process.

With reference to FIG. 3, a flowchart 300 of a commercial process is shown. At function block 302, a user accesses a merchant site that utilizes the present system's payment system and selects Debit as the form of payment for services and/or merchandise offered by the merchant. A 128 Bit SSL secured session is established between the Web server and the client PC at function block 304.

Under this secured communications path, the system's software is downloaded and installed on the client at function block 306. A digital certificate for establishing SSL sessions may be loaded on the Web Server. The The Host Cryptographic Module may manually load randomly generated TDES keys [KPS] under dual control and split-knowledge for use in encrypting the Acquisition data for storage.

The process continues with Communications Key Establishment at function block 308. An RSA Public/Private Key pair (1024 bit) is generated. The Public Key is sent via SSL to the Web Server and then as clear text to the Application server and finally to the Host Cryptographic Module. The Host Cryptographic Module generates a 256 Bit AES key $AES_{(comm)}$ to be used in protecting communications between the client and the Applications Server. The Host Cryptographic Module also generates a 256 Bit AES key ($AES_{(Data)}$), this one is used to encrypt the Acquisition Data between the Client and the Host Cryptographic Module. The Host Cryptographic Module salts the $AES_{(comm)}$key, then generates a cryptographic hash (SHA-512) of the salted $AES_{(comm)}$key, and then wraps the salted $AES_{(comm)}$key, along with the cryptographic hash with the Client's RSA Public Key. This cryptogram is then presented to the Application Server. The Host Cryptographic Module salts the $AES_{(Data)}$key, then generates a cryptographic hash (SHA-512) of the salted $AES_{(Data)}$key, and then wraps the salted $AES_{(Data)}$key, along with the cryptographic hash with the Client's RSA Public Key. This cryptogram is further encrypted with the $AES_{(comm)}$key.

This cryptogram is then presented to the Application Server. The Host Cryptographic Module combines the two elements, salts the combination, then generates a cryptographic hash (SHA-512) for the salted combination, then encrypts the salted combination, along with the cryptographic hash of the salted combination with the Client's Public Key. This cryptogram is then presented to the Application Server, and is ultimately transmitted back to the Client further wrapped within SSL.

The Client decrypts the key package with its Private key, and then generates a cryptographic hash (SHA-512) of the result, comparing the calculated cryptographic hash with the one provided in the key exchange message. The Client decrypts the received cryptogram, first with the $AES_{(comm)}$ and then with the Client's Private key making the $AES_{(Data)}$ key available for communications between the client and the Host Cryptographic Module. The Client then decrypts the cryptogram containing the $AES_{(comm)}$ key using its Private key, generates a cryptographic hash (SHA-512) of the resulting key, comparing the calculated cryptographic hash with the one provided in the key exchange message. The Client then decrypts the cryptogram containing the $AES_{(Data)}$ key using the $AES_{(comm)}$ key, further decrypting the result with its Private key, then generates of cryptographic hash of the resulting key, comparing the calculated cryptographic hash with the one provided in the key exchange message. The Client now has both the $AES_{(comm)}$ key, and the $AES_{(Data)}$ key for further communication with the Application Server.

Once the communications paths have been established, the acquisition data may be delivered at function block 310. Acquisition data is first 'salted' then encrypted under the $AES_{(Data)}$ Key. Additional information to be transmitted with the Acquisition data is concatenated, and the result is again 'salted'. The client performs a cryptographic hash of the resulting cryptogram using SHA-512. The resulting cryptographic hash is concatenated to the block if data to be transmitted and the resulting value is encrypted under the $AES_{(comm)}$ key. The result of the encryption is then processed with CRC-64. CRC is appended to the cryptogram. This cryptogram is finally sent under SSL to the Web Server. The Web server removes the SSL encryption and forwards the message to the Application Server.

Once received by the Application Server, the message's integrity is verified at function block 312. The Application Server parses the message and a CRC is performed on the concatenation of cryptogram and Hash. The newly calculated CRC is compared to the CRC sent with the message. If they match, integrity is verified and the process continues. If not, the process ends and an error is generated.

The Application Server calls to the HCM to decrypt the message with the $AES_{(comm)}$ Key. The Application Server parses the concatenation again and a SHA-512 is performed against the cryptogram. The newly calculated Hash is compared to the Hash sent with the message. If they match, integrity is verified and the process continues. If not, the process ends and an error is generated. The cryptogram is sent to the Host Cryptographic Module. The Acquisition Data is securely stored awaiting the start of the Authorization Process. The Host Cryptographic Module decrypts the Acquisition Data from the $AES_{(Data)}$ key and re-encrypts with the $TDES_{(Storage)}$ Key [KPS] and send the resulting cryptogram to the Acquisition Storage area.

The following actions or activities may be accomplished before the first transaction can be authorized. The PIN Distillation TRSM manually loads randomly generated TDES keys under dual control and split-knowledge for use as PIN encrypting keys (PEK) [KPT or KPS] to protect PIN Blocks when transmitted to the EFT Interface. The Host Cryptographic Module manually loads randomly generated TDES keys under dual control and split-knowledge for use as Master Keys [*KKS] to protect all other keys while in storage. The Host Cryptographic Module manually loads randomly generated TDES keys under dual control and split-knowledge for use as Key encrypting keys (KEK) [KKT] to protect the exchange of key used to protect PIN Blocks (PEK) [KPT] when transmitted to the EFT Networks.

The authorization process begins when a merchant accesses the system's Transaction Manager and requests payment for services and/or merchandise offered by the merchant. Once initiated, the Gateway Server uses transaction information provided by the merchant via the Transaction Manager to identify the proper acquisition data cryptogram in storage. The Gateway Server requests the acquisition data cryptogram from storage and provides it to the PIN Distillation TRSM.

The PIN Distillation TRSM decrypts the acquisition data cryptogram using the $TDES_{(Storage)}$ Key [KPS]. The PIN Distillation TRSM distills the cardholder's PIN from the Acquisition Data. The PIN Distillation TRSM creates the required PIN Block (ANSI Format 0) and encrypts with the $PEK_{(ATMD)}$ [KPS]. The PIN Distillation TRSM provides the cryptogram to the Gateway. The Gateway sends the cryptogram to the EFT Interface. The EFT Interface sends the cryptogram to the Host Cryptographic Module. The Host Cryptographic Module translates the PIN Block from encryption under $PEK_{(ATMD)}$ [KPS] to encryption under $PEK_{(EFT)}$ [KPT]. The resulting cryptogram is sent back to the EFT Interface. The EFT Interface sends the cryptogram to the EFT Network.

It will be appreciated by those skilled in the art having the benefit of this disclosure that this invention provides a system for PIN exchange. It should be understood that the drawings and detailed description herein are to be regarded in an illustrative rather than a restrictive manner, and are not intended to limit the invention to the particular forms and examples disclosed. On the contrary, the invention includes any further modifications, changes, rearrangements, substitutions, alternatives, design choices, and embodiments apparent to those of ordinary skill in the art, without departing from the spirit and scope of this invention, as defined by the following claims. Thus, it is intended that the following claims be interpreted to embrace all such further modifications, changes, rearrangements, substitutions, alternatives, design choices, and embodiments.

What is claimed is:

1. A method for securely transferring data between a first device and a second device over an open network, comprising the steps of:

establishing a secure connection to the first device over the open network through an open network server;

generating a public/private encryption key pair at the first device;

transmitting a public encryption key of the public/private encryption key pair to the second device on the secure connection over the open network;

generating a first encryption key for encrypting communications between the first device and the second device and a second encryption key for encrypting the data transmitted between the first device and the second device;

providing a first cryptogram including the first encryption key to the second device and the first device;

providing a second cryptogram including the second encryption key to the second device and the first device;

providing a third cryptogram including both the first encryption key and the second encryption key to the second device and the first device;

decrypting the first, second and third cryptograms at the first device to determine the first encryption key and the second encryption key; and providing secure information transfer between the first device and the second device using the public/private encryption key pair, the first encryption key and the second encryption key.

2. The method of claim 1 further including the step of downloading software to the first device over the secure connection providing for the processing of the public/private encryption key pair, the first encryption key and the second encryption key.

3. The method of claim 1, wherein the step of establishing further comprises the step of establishing an SSL secured session.

4. The method of claim 1, wherein the step of generating further comprises the step of generating an RSA public/private encryption key pair at the first device.

5. The method of claim 1, wherein the step of providing a first cryptogram further comprises the steps of:
salting the first encryption key;
generating a first cryptographic hash of the salted first encryption key; and
encrypting the salted first encryption key and the first cryptographic hash using the public encryption key to create the first cryptogram.

6. The method of claim 1, wherein the step of providing a second cryptogram further comprises the steps of:
salting the second encryption key;
generating a second cryptographic hash of the salted second encryption key;
encrypting the salted first encryption key and the first cryptographic hash using the public encryption key to create a temporary cryptogram; and
encrypting the temporary cryptogram using the first encryption key to create the second cryptogram.

7. The method of claim 1, wherein the step of providing a third cryptogram further comprises the steps of:
combining the first encryption key with the second encryption key;
salting the combined first and second encryption keys;
generating a third cryptographic hash of the salted, combined first and second encryption keys; and
encrypting the salted combination of the first and second encryption keys and the third cryptographic hash using the public encryption key to create the third cryptogram.

8. The method of claim 1, wherein the step of decrypting further comprises the steps of:
decrypting the third cryptogram using the first encryption key;
decrypting the decrypted third cryptogram using the private key of the public/private key pair to obtain the second encryption key.

9. The method of claim 8, further including the steps of:
generating a fourth cryptographic hash of the decrypted third cryptogram;
comparing the fourth cryptographic hash to the third cryptographic hash.

10. The method of claim 1, wherein the step decrypting further comprises the steps of:

decrypting the first cryptogram using the private key of the public/private key pair to obtain the first encryption key;
generating a fifth cryptographic hash of the decrypted first cryptogram; and
comparing the fifth cryptographic hash with the first cryptographic hash.

11. The method of claim 1, wherein the step decrypting further comprises the steps of:
decrypting the second cryptogram using the private key of the public/private key pair to obtain the second encryption key;
generating a sixth cryptographic hash of the decrypted second cryptogram; and
comparing the sixth cryptographic hash with the second cryptographic hash.

12. The method of claim 1, wherein the step of providing secure information transfer further comprises the steps of:
salting the data to be transferred from the first device to the second device;
encrypting the salted data using the second encryption key;
performing a final cryptographic hash of the encrypted, salted data;
appending a CRC to the final cryptographic hash; and
transmitting the final cryptographic hash with appended CRC from the first device to the second device.

13. The method of claim 12, wherein the step of establishing further comprises the steps of:
establishing a secure connection to the first device over the open network through an open network server;
generating a public/private encryption key pair at the first device;
transmitting a public encryption key of the public/private encryption key pair to the second device on the secure connection over the open network;
generating a first encryption key for encrypting communications between the first device and the second device and a second encryption key for encrypting the data transmitted between the first device and the second device.

14. The method of claim 13, wherein the step of providing a first cryptogram further comprises the steps of:
salting the first encryption key;
generating a first cryptographic hash of the salted first encryption key; and
encrypting the salted first encryption key and the first cryptographic hash using the public encryption key to create the first cryptogram.

15. The method of claim 13, wherein the step of providing a second cryptogram further comprises the steps of:
salting the second encryption key;
generating a second cryptographic hash of the salted, second encryption key;
encrypting the salted first encryption key and the first cryptographic hash using the public encryption key to create a temporary cryptogram; and
encrypting the temporary cryptogram using the first encryption key to create the second cryptogram.

16. The method of claim 13, wherein the step of providing a third cryptogram further comprises the steps of:
combining the first encryption key with the second encryption key;
salting the combined first and second encryption keys;
generating a third cryptographic hash of the salted combined first and second encryption keys; and encrypting the salted combination of the first and second encryption keys and the third cryptographic hash using the public encryption key to create the third cryptogram.

17. The method of claim 13, wherein the step of decrypting further comprises the steps of:
   decrypting the third cryptogram using the first encryption key;
   decrypting the decrypted third cryptogram using the private key of the public/private key pair to obtain the second encryption key.

18. The method of claim 13, further including the steps of:
   generating a fourth cryptographic hash of the decrypted third cryptogram;
   comparing the fourth cryptographic hash to the third cryptographic hash.

19. The method of claim 13, wherein the step decrypting further comprises the steps of:
   decrypting the second cryptogram using the private key of the public/private key pair to obtain the second encryption key;
   generating a sixth cryptographic hash of the decrypted second cryptogram; and
   comparing the sixth cryptographic hash with the second cryptographic hash.

20. The method of claim 13, wherein the step of providing secure information transfer further comprises the steps of:
   salting the data to be transferred from the first device to the second device;
   encrypting the salted data using the second encryption key;
   performing a final cryptographic hash of the encrypted, salted data;
   appending a CRC to the final cryptographic hash; and
   transmitting the final cryptographic hash with appended CRC from the first device to the second device.

21. A method for securely transferring data between a first device and a second device over an open network, comprising the steps of:
   receiving a request for data at the second device from the first device;
   establishing secure communications paths between the first device and the second device over the open network using a plurality of encryption keys said step of establishing further comprising the steps of:
      providing a plurality of cryptograms including the plurality of encryption keys to the first and second devices;
      decrypting the plurality of cryptograms to determine the plurality of encryption keys;
   providing secure information transfer between the first device and the second device using the plurality of encryption keys.

22. The method of claim 21 wherein the step of providing further comprises the steps of:
   providing a first cryptogram including the first encryption key to the second device and the first device;
   providing a second cryptogram including the second encryption key to the second device and the first device; and
   providing a third cryptogram including both the first encryption key and the second encryption key to the second device and the first device.

23. The method of claim 22 wherein the step of decrypting further comprises the step of decrypting the first, second and third cryptograms at the first device to determine the first encryption key and the second encryption key.

* * * * *

UNITED STATES PATENT AND TRADEMARK OFFICE
CERTIFICATE OF CORRECTION

| | |
|---|---|
| PATENT NO. | : 7,387,240 B2 |
| APPLICATION NO. | : 11/010191 |
| DATED | : June 17, 2008 |
| INVENTOR(S) | : Robert Ziegler |

It is certified that error appears in the above-identified patent and that said Letters Patent is hereby corrected as shown below:

On page 1, the filing date "Mar. 8, 2005" should be changed to --Dec. 11, 2004--.

Signed and Sealed this

Twenty-first Day of July, 2009

JOHN DOLL
*Acting Director of the United States Patent and Trademark Office*